US007078497B2

(12) United States Patent
Käser et al.

(10) Patent No.: US 7,078,497 B2
(45) Date of Patent: Jul. 18, 2006

(54) DISAZO DYES, AND COPPER COMPLEXES THEREOF, FOR DYEING PAPER

(75) Inventors: Adolf Käser, Bottmingen (CH); Holger Lautenbach, Grenzach-Wyhlen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 303 days.

(21) Appl. No.: 10/451,835

(22) PCT Filed: Dec. 19, 2001

(86) PCT No.: PCT/EP01/15009

§ 371 (c)(1),
(2), (4) Date: Jun. 25, 2003

(87) PCT Pub. No.: WO02/053649

PCT Pub. Date: Jul. 11, 2002

(65) Prior Publication Data

US 2004/0063920 A1  Apr. 1, 2004

(30) Foreign Application Priority Data

Dec. 28, 2000 (EP) ................................ 008112567

(51) Int. Cl.
  *C09B 35/29* (2006.01)
  *C09B 35/35* (2006.01)
  *D21H 21/28* (2006.01)
  *C09B 45/28* (2006.01)

(52) U.S. Cl. ................ 534/570; 534/689; 534/797; 534/810; 534/818; 534/823; 534/824; 534/828; 8/527; 8/681; 8/919

(58) Field of Classification Search ............... 534/570, 534/689, 797, 810, 818, 823, 824, 828; 8/527, 8/681, 919
See application file for complete search history.

(56) References Cited

U.S. PATENT DOCUMENTS

| 2,357,977 | A | | 9/1944 | Rossander ................... 260/181 |
| 2,426,977 | A | * | 9/1947 | Straub et al. ................ 534/671 |
| 2,620,331 | A | | 12/1952 | Wehrli ........................ 260/148 |
| 2,927,917 | A | | 3/1960 | Durig et al. ................. 260/148 |
| 3,399,187 | A | | 8/1968 | Dürig et al. ................. 260/148 |
| 3,502,644 | A | | 3/1970 | Nickel et al. ................ 260/154 |
| 3,539,348 | A | | 11/1970 | Vetter et al. .................... 96/99 |
| 3,562,246 | A | | 2/1971 | Barwick, III et al. ........ 260/148 |
| 3,770,444 | A | * | 11/1973 | Froehlich ..................... 430/562 |
| 4,514,188 | A | | 4/1985 | Michna et al. ................. 8/641 |
| 4,515,599 | A | | 5/1985 | Käser ............................ 8/685 |
| 4,711,668 | A | | 12/1987 | Shimada et al. .............. 106/22 |
| 4,804,411 | A | * | 2/1989 | Eida et al. ............... 106/31.48 |
| 5,007,942 | A | * | 4/1991 | Claussen et al. ............... 8/506 |
| 5,049,238 | A | | 9/1991 | Käser ......................... 162/162 |
| 5,288,294 | A | * | 2/1994 | Kaser ............................ 8/687 |
| 6,984,723 | B1 | * | 1/2006 | Kaser ......................... 534/569 |

FOREIGN PATENT DOCUMENTS

| CH | 482000 | * | 1/1970 |
| DE | 721453 | | 6/1942 |
| DE | 951948 | | 10/1956 |
| DE | 1522371 | | 7/1969 |
| DE | 1937361 | | 4/1971 |
| DE | 1644189 | | 7/1971 |
| DE | 1794286 | | 11/1971 |
| DE | 2240978 | * | 3/1973 |
| DE | 2622517 | | 12/1977 |
| DE | 3613009 | | 10/1986 |
| EP | 0043792 | | 1/1982 |
| EP | 0051785 | | 5/1982 |
| EP | 0354872 | | 2/1990 |
| EP | 0896032 | | 2/1999 |
| GB | 907757 | | 10/1962 |
| GB | 907758 | | 10/1962 |
| GB | 1199243 | | 7/1970 |
| GB | 1311975 | | 3/1973 |
| GB | 1368563 | * | 10/1974 |
| GB | 1520597 | * | 8/1978 |
| GB | 2070795 | | 9/1981 |
| JP | 05-295282 | * | 11/1993 |
| JP | 09-230142 | * | 9/1997 |
| WO | 00/55259 | | 9/2000 |

OTHER PUBLICATIONS

English language abstract for EP 0051785 (1982).
English language abstract for EP 0896032 (1999).
Derwent Abstract 1977-88370Y [50] for DE 2622517 (1977).

* cited by examiner

*Primary Examiner*—Fiona T. Powers
(74) *Attorney, Agent, or Firm*—Kevin T. Mansfield

(57) ABSTRACT

The dyes of formula (1) according to claim 1 and the copper complexes of dyes of formula (2) according to claim 9 or the mixtures of mono-copper complex with the bis-copper complex are excellently suitable for dyeing paper with good light-fastness properties.

16 Claims, No Drawings

DISAZO DYES, AND COPPER COMPLEXES THEREOF, FOR DYEING PAPER

The present invention relates to dyes of formula

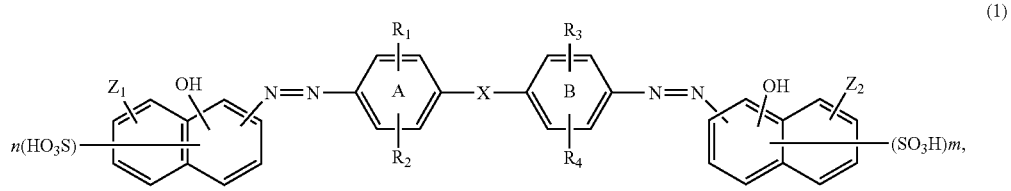

(1)

wherein
$Z_1$ is $NHR_6$,
$R_6$ being a radical of formula $CO-R_8$, $CO-NH-R_8$, $SO_2$-alkyl, $SO_2$-aryl,

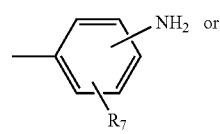

$COOR_8$,
$R_8$ being hydrogen, alkyl or aryl and
$R_7$ being COOH or $SO_3H$ in the o-position to the $NH_2$ group,
$Z_2$ is as defined for $Z_1$ or is hydrogen, hydroxy, alkoxy or a radical $NHR_5$,
$R_5$ being hydrogen, alkyl, aryl, $COR_8$, $CO-NHR_8$ or $SO_2R_8$,
$R_1$ and $R_3$ are each independently of the other hydrogen, hydroxy, alkyl or alkoxy,
$R_2$ and $R_4$ are each independently of the other hydrogen, hydroxy, alkyl or alkoxy, halogen, sulfo, carboxy, $NHCONHR_8$ or $NHCOR_8$, X is a direct bond in which case symmetrical compounds wherein $Z_1$ and $Z_2$ are $NHCOCH_3$, $NHCOOCH_3$ or NHCO-phenyl are excluded, or is —C=C— in which case both $Z_1$ and $Z_2$ cannot simultaneously be acetylamino, benzoylamino or 4-amino-3-sulfo-anilino, or is azo, azoxy, —$NR_8$, —$NR_8CONR_9$— or a group of formula

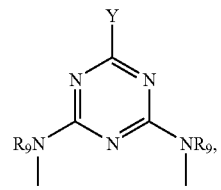

Y being hydroxy, alkoxy or $NR_8R_{10}$,
$R_9$ and $R_{10}$ being each independently of the other hydrogen, unsubstituted or substituted alkyl or unsubstituted or substituted aryl,
n and m are each independently of the other 1 or 2,
and wherein the rings A and B may each independently of the other carry a fused-on benzene ring,
with the proviso that the compounds of formulae

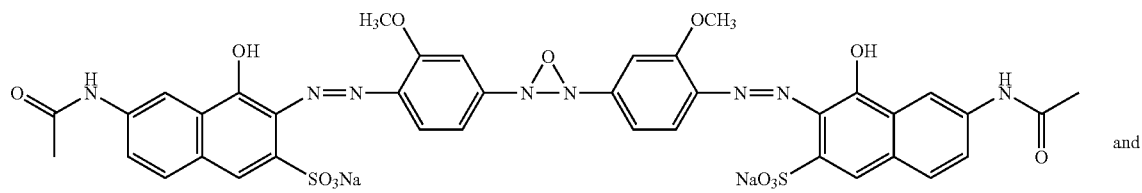

and

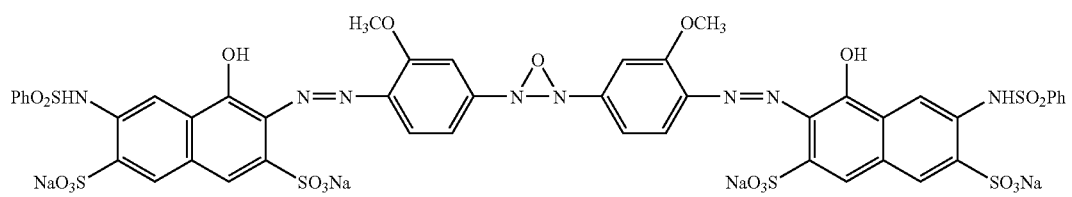

are excluded.

The present invention relates also to mono- or bis-copper complexes of dyes of formula

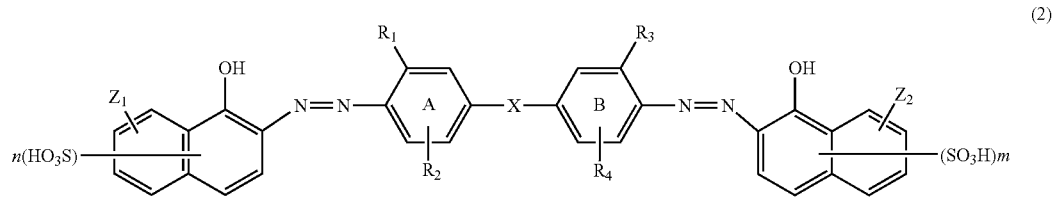

(2)

wherein $R_1$ and/or $R_3$ are hydroxy or alkoxy and the other substituents are as defined for formula (1).

In this Application, the dyes are shown in the form of the free acid, but the corresponding salts, for example metal or ammonium salts, are also to be included.

In the dyes of formula (1), X is preferably azo, azoxy or —C=C—.

In this Application, halogen is generally fluorine, bromine or, especially, chlorine.

According to the invention, alkyl radicals are to be understood as being generally open-chain or branched or cyclic alkyl radicals, preferably containing from 1 to 8 carbon atoms, for example methyl, ethyl, n- or iso-propyl, n-, sec- or tert-butyl, n-hexyl, n-octyl, cyclopentyl and cyclohexyl.

Aryl is to be understood as being especially naphthyl or phenyl, each of which may be substituted by, for example, $C_1$–$C_4$alkyl, and more especially unsubstituted naphthyl or phenyl.

These alkyl radicals and also the cycloalkyl or aryl groups may be mono- or poly-substituted, for example by hydroxy, carboxy, halogen, cyano, amino or $C_1$–$C_4$alkoxy.

The alkoxy radicals may have from 1 to 12 carbon atoms, preferably from 1 to 4 carbon atoms and are, for example, methoxy, ethoxy, propoxy, isopropoxy, n-butoxy, isobutoxy, tert-butoxy, n-pentyloxy and n-hexyloxy. The alkoxy groups also may be substituted, for example by the radicals listed as possible substituents for the alkyl groups, especially by hydroxy or $C_1$–$C_4$alkoxy.

In the dyes of formula (1) and copper complexes thereof, $Z_2$ is preferably hydrogen, hydroxy, alkoxy, amino, NH—COO—$C_1$–$C_4$alkyl, or anilino which is unsubstituted or substituted by amino and/or by sulfo.

$Z_1$ is preferably NH—COO—$C_1$–$C_4$alkyl or the 4-amino-3-sulfo-anilino radical.

$R_2$ and $R_4$ are preferably hydrogen, $C_1$–$C_4$alkyl or $C_1$–$C_4$alkoxy.

In especially preferred dyes, $Z_1$ and $Z_2$ are identical and each is NH—COO—$C_1$–$C_4$alkyl or the 4-amino-3-sulfo-anilino radical.

The dyes of formula (1) are prepared in a manner known per se, for example a diamine of formula

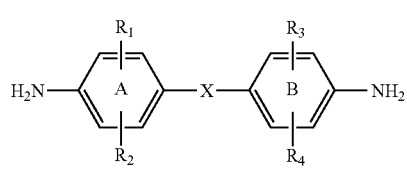

(3)

is tetraazotised in known manner and coupled with 2 moles of a coupling component of formula

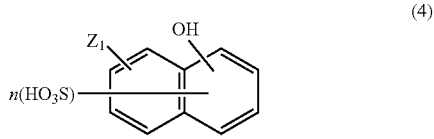

(4)

or with 1 mole each of a coupling component of formula (4) and a coupling component of formula

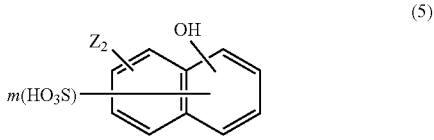

(5)

under conditions known per se.

It is also possible first to prepare the monoazo compounds of formulae

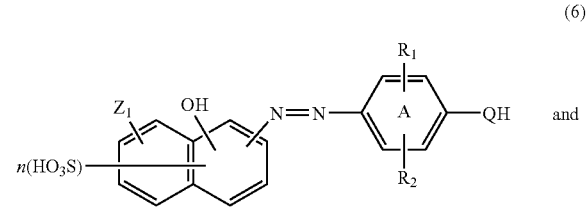 and (6)

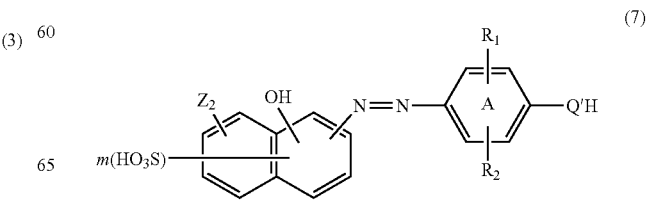

(7)

and to react 2 moles of a compound of formula (6) or 1 mole of a compound of formula (6) and 1 mole of a compound of formula (7) with a compound U—X—U', QH and Q'H in each case being a group which can be replaced with a bridging member of formula X with removal of UH and U'H, respectively.

Such reactions have been described many times in the literature for the preparation of bridged disazo dyes.

When X is an azoxy group, the corresponding compounds of formula (1) can also be prepared in a manner likewise known per se by diazotisation of unsubstituted or substituted p-nitroanilines, coupling with a coupling component of formula (4) and/or (5) and subsequent reduction, for example using glucose.

The dyes of formula (1) which contain a free amino group can, in many cases, be prepared in pure form only with difficulty. An improvement can be achieved by introducing a protecting group which is subsequently removed. That is the case especially for those dyes wherein X is azoxy. Suitable protecting groups are those that are readily removable and that are stable under the conditions of the basic azoxy condensation. An alkoxycarbonyl group, especially the ethoxycarbonyl group, is especially suitable.

The mono- or bis-copper complexes of dyes of formula (2) are obtained in a manner known per se by means of copper-treatment of the customarily prepared dyes of formula (1) using copper-yielding agents in amounts of from 1 to 2.5 moles of copper per mole of dye of formula (1). The copper-treatment can also be carried out by demethylation as a result of cleavage of an alkoxy group or oxidatively with introduction of an additional oxygen group.

The invention preferably relates to the mono-copper complexes of dyes of formula (2) and mixtures thereof with the bis-copper complexes of such dyes.

These are obtained in a manner known per se by means of copper-treatment of the conventionally prepared dyes of formula (2) using copper-yielding agents in amounts of from 1 to 1.5 moles of copper per mole of dye of formula (2).

Depending upon the nature of the bridging member X, it is also possible for one of the halves of the dye of formula (2) that are connected by X to be reacted with up to 1 mole of copper-yielding agent and then to be connected to the second, non-copper-treated half by a direct bond or via the bridging member X. It is preferred, however, to start from the dye of formula (2) and to react that dye with a copper-yielding agent.

The dyes of formula (1) and the mono- and bis-copper complexes of dyes of formula (2) are suitable for dyeing natural and synthetic material.

The material is, for example, fibre material of leather, wool, polyamide, glass fibres or cotton and, especially, paper.

Using customary dyeing methods, blue dyeings having good fastness properties are obtained on such materials. Dyeings using the copper complexes especially have excellent light-fastness properties. The shade and the light-fastness can be controlled by the amount of copper used. When preparing mixtures of the mono-copper complexes with the bis-copper complexes, the amount of free copper in the effluents from synthesis can be reduced to a value of under 100 ppm whilst still obtaining good light-fastness properties.

The invention relates also to the use, for dyeing paper, of dyes of formula

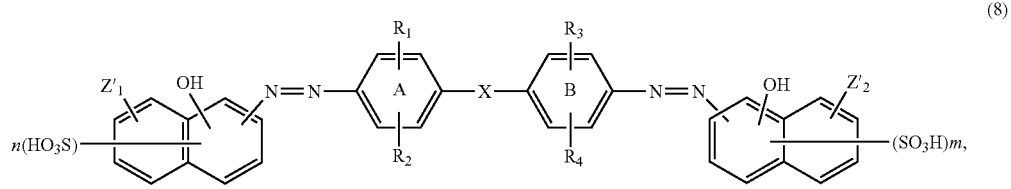

(8)

wherein $Z'_1$ is $NHR_6$, $R_6$ being a radical of formula CO—$R_8$, CO—NH—$R_8$, $SO_2$-alkyl, $SO_2$-aryl,

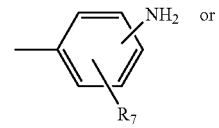

$COOR_8$, $R_8$ being hydrogen, alkyl or aryl and $R_7$ being COOH or $SO_3H$ in the opposition to the $NH_2$ group, $Z'_2$ is as defined for $Z'_1$ or is hydrogen, hydroxy, alkoxy or a radical $NHR_5$, $R_5$ being hydrogen, alkyl, aryl, $COR_8$, CO—$NHR_8$ or $SO_2R_8$, $R_1$ and $R_3$ are each independently of the other hydrogen, hydroxy, alkyl or alkoxy, $R_2$ and $R_4$ are each independently of the other hydrogen, hydroxy, alkyl or alkoxy, halogen, sulfo, carboxy, $NHCONHR_8$ or $NHCOR_8$, X Is a bridging member or a direct bond, n and m are each independently of the other 1 or 2, and wherein the rings A and B may each independently of the other carry a fused-on benzene ring, it not being possible for both $Z'_1$ and $Z'_2$ simultaneously to be acetylamino or benzoylamino when X is a bridging member of formula —C=C—, and with the proviso that the compound of formula

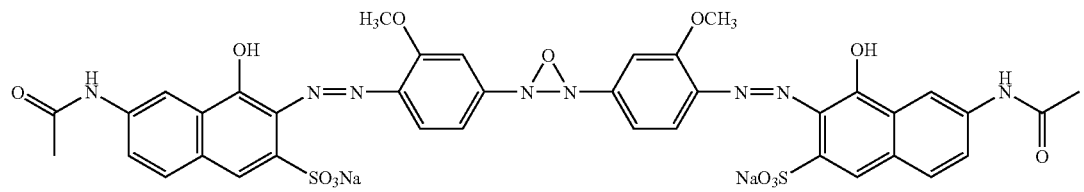

is excluded.

The dyes of formula (1) and the copper complexes of dyes of formula (2) or the mixtures of mono-copper complex with the bis-copper complex are preferably used as solid or liquid commercial forms.

In the form of powder or granules, the dyes are used especially in discontinuous mass dyeing, the dyes being added usually in the form of a stock solution to the pulper, hollander or mixing vat. In this case dye preparations are preferably used which may also comprise, besides the dye, diluents, e.g. urea as solubiliser, dextrin, Glauber's salt, sodium chloride and dispersants, dusting agents and sequestrants, such as tetrasodium phosphate.

The invention accordingly relates also to solid dye preparations for dyeing paper, which preparations comprise a dye of formula (1) according to the invention or a mono- or bis-copper complex of a dye of formula (2).

In recent years, the use of concentrated aqueous solutions of dyes has gained in importance, specifically because of the advantages which such solutions have over dyes in powder form. By using solutions, the difficulties associated with the formation of dust are avoided and the users are freed from the time-consuming and often difficult dissolution of the dye powder in water. The use of concentrated solutions has been prompted furthermore by the development of continuous dyeing processes for paper, since in those processes it is advantageous to add the solution in metered amounts directly to the pulp flow or at any other suitable point in the paper-making.

The invention accordingly relates also to concentrated aqueous solutions of the dyes of formula (1) used in accordance with the invention or of the mono- or bis-copper complexes of dyes of formula (2) for dyeing paper, which solutions contain from 5 to 30% by weight of dye, based on the total weight of the solution.

The concentrated solutions may comprise further auxiliaries, for example solubilisers, such as ε-caprolactam or urea, organic solvents, such as glycols, polyethylene glycols, dimethyl sulfoxide, N-methylpyrrolidone, acetamide, alkanolamines or polyglycolamines.

The following Examples serve to illustrate the invention but do not limit the invention thereto. Parts and percentages relate to weight, unless otherwise indicated.

EXAMPLE 1

127.6 parts of 1-amino-8-naphthol-3,6-disulfonic acid are dissolved in 600 parts of water containing 30% sodium hydroxide solution at pH 6.5 to 7; the solution is then adjusted to a pH of 2.5 using 32% hydrochloric acid and stirred to form a homogeneous suspension. Starting at a temperature of 5° C., 54 parts of chloroformic acid ethyl ester are added dropwise over 1 hour, in the course of which the temperature rises to about 32° C., the pH being maintained at 2.5 by the dropwise addition of 30% sodium hydroxide solution. Heating at 35° C. is carried out until no more sodium hydroxide solution is used.

In a separate vessel, 16.8 parts of 2-amino-5-nitroanisole are diazotised in 100 parts of water containing 32% hydrochloric acid and sodium nitrite. The reaction solution is then coupled with 43 parts of the above-described 1-ethoxycarbonyl-8-naphthol-3,6-disulfonic acid in 170 parts of water at room temperature and pH 7 with addition of 30% sodium hydroxide solution. The suspension obtained is heated to a temperature of from 50 to 60° C.; 110 parts of 30% sodium hydroxide solution are added and, in the course of 1 hour, a solution of 15 parts of glucose in 60 parts of water is added. As soon as no more starting material is detectable, the pH is adjusted to 7.5 using 32% hydrochloric acid, with cooling, salted out with 60 parts of sodium chloride and filtered. The dye of formula

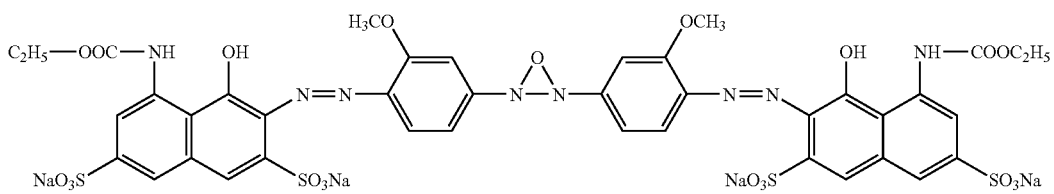

is obtained. It dyes cellulose fibres, especially paper, brilliant reddish-blue shades having good fastness properties and with a high degree of exhaustion.

EXAMPLES 2–11

By proceeding as described in Example 1, but using the coupling components listed in the following Table, dyes are obtained that have similarly good properties, especially when dyeing paper.

| Example | Coupling Component |
|---|---|
| 2 | 1-methoxycarbonylamino-8-naphthol-3,6-disulfonic acid |
| 3 | 1-ethoxycarbonylamino-8-naphthol-2,4-disulfonic acid |
| 4 | 1-ethoxycarbonylamino-8-naphthol-4,6-disulfonic acid |
| 5 | 2-ethoxycarbonylamino-5-naphthol-1,7-disulfonic acid |
| 6 | 3-ethoxycarbonylamino-5-naphthol-2,7-disulfonic acid |
| 7 | 2-ethoxycarbonylamino-5-naphthol-7-sulfonic acid |
| 8 | 3-ethoxycarbonylamino-5-naphthol-7-sulfonic acid |
| 9 | 2-ethoxycarbonylamino-5-naphthol-4,8-disulfonic acid |
| 10 | 2-(4-amino-3-sulfo-anilino)-5-naphthol-7-sulfonic acid |
| 11 | 3-(4-amino-3-sulfo-anilino)-5-naphthol-7-sulfonic acid |

EXAMPLE 12

28 parts of 4,4'-diamino-3,3'-dimethoxy-azobenzene are tetraazotised in 200 parts of water containing 40 parts of 32% hydrochloric acid and 50 ml of 4N sodium nitrite solution at 0–5° C. Then, at 10–20° C., coupling to 86 parts of 2-ethoxycarbonylamino-5-naphthol-1,7-disulfonic acid, dissolved in 250 parts of water, is carried out, the pH being maintained at 7.5–8 by the addition of 30% sodium hydroxide solution. Then, salting-out using 80 parts of sodium chloride and filtration are carried out. A dye is obtained that has similarly good properties to the dye described in Example 1.

EXAMPLES 13–62

By proceeding as described in Example 12, but using the diamines listed in the following Table together with 2 equivalents of the listed coupling components, dyes are obtained that have similarly good properties, especially when dyeing paper. It is also possible, in a manner known per se, first to react the first diazo group of the diamine with a first coupling component and then to react the second diazo group with a second coupling component.

| Example | Diamine | Coupling Component |
|---|---|---|
| 13 | 4,4'-diamino-3,3'-dimethoxy-azobenzene | 1-ethoxycarbonylamino-8-naphthol-3,6-disulfonic acid |
| 14 | 4,4'-diamino-3,3'-dimethoxy-azobenzene | 1-methoxycarbonylamino-8-naphthol-3,6-disulfonic acid |
| 15 | 4,4'-diamino-3,3'-dimethoxy-azobenzene | 3-ethoxycarbonylamino-5-naphthol-2,7-disulfonic acid |
| 16 | 4,4'-diamino-3,3'-dimethoxy-azobenzene | 2-ethoxycarbonylamino-5-naphthol-1,7-disulfonic acid |
| 17 | 4,4'-diamino-3,3'-dimethoxy-azobenzene | 2-ethoxycarbonylamino-5-naphthol-4,8-disulfonic acid |
| 18 | 4,4'-diamino-3,3'-dimethoxy-azobenzene | 2-(4-amino-3-sulfo-anilino)-5-naphthol-7-sulfonic acid |
| 19 | 4,4'-diamino-3,3'-dimethoxy-azobenzene | 1st coupling comp.: 2-ethoxycarbonylamino-5-naphthol-7-sulfonic acid<br>2nd coupling comp.: 2-ethoxycarbonylamino-5-naphthol-1,7-disulfonic acid |
| 20 | 4,4'-diamino-azobenzene | 1-ethoxycarbonylamino-8-naphthol-3,6-disulfonic acid |
| 21 | 4,4'-diamino-2'-methyl-azobenzene | 1-ethoxycarbonylamino-8-naphthol-3,6-disulfonic acid |
| 22 | 4,4'-diamino-2'-methyl-azobenzene | 3-ethoxycarbonylamino-5-naphthol-1,7-disulfonic acid |
| 23 | 4,4'-diamino-2'-methyl-azobenzene | 1st coupling comp.: 1-naphthol-3,6-disulfonic acid<br>2nd coupling comp.: 2-ethoxycarbonylamino-5-naphthol-7-disulfonic acid |
| 24 | 4,4'-diamino-2'-methyl-azobenzene | 2-ethoxycarbonylamino-5-naphthol-4,8-disulfonic acid |
| 25 | 4,4'-diamino-2'-methyl-azobenzene | 2-(4-amino-3-sulfo-anilino)-5-naphthol-7-sulfonic acid |
| 26 | 4,4'-diamino-2',5'-dimethyl-azobenzene | 1-ethoxycarbonylamino-8-naphthol-3,6-disulfonic acid |
| 27 | 4,4'-diamino-2',5'-dimethyl-azobenzene | 2-ethoxycarbonylamino-5-naphthol-1,7-disulfonic acid |
| 28 | 4,4'-diamino-3'-methoxy-azobenzene | 1-ethoxycarbonylamino-8-naphthol-3,6-disulfonic acid |
| 29 | 4,4'-diamino-3'-methoxy-azobenzene | 2-ethoxycarbonylamino-5-naphthol-1,7-disulfonic acid |
| 30 | 4,4'-diamino-2'-methoxy-azobenzene | 1-ethoxycarbonylamino-8-naphthol-3,6-disulfonic acid |
| 31 | 4,4'-diamino-2'-methoxy-azobenzene | 2-ethoxycarbonylamino-5-naphthol-1,7-disulfonic acid |
| 32 | 4,4'-diaminostilbene | 1-ethoxycarbonylamino-8-naphthol-3,6-disulfonic acid |
| 33 | 4,4'-diaminostilbene | 1-methoxycarbonylamino-8-naphthol-3,6-disulfonic acid |
| 34 | 4,4'-diaminostilbene | 3-ethoxycarbonylamino-5-naphthol-2,7-disulfonic acid |
| 35 | 4,4'-diaminostilbene | 2-ethoxycarbonylamino-5-naphthol-1,7-disulfonic acid |
| 36 | 4,4'-diaminostilbene | 2-ethoxycarbonylamino-5-naphthol-4,8-disulfonic acid |
| 37 | 4,4'-diaminostilbene | 2-(4-amino-3-sulfo-anilino)-5-naphthol-7-sulfonic acid |
| 38 | 4,4'-diamino-3,3'-dimethoxy-stilbene | 1-ethoxycarbonylamino-8-naphthol-3,6-disulfonic acid |
| 39 | 4,4'-diamino-3,3'-dimethoxy-stilbene | 2-ethoxycarbonylamino-5-naphthol-1,7-disulfonic acid |
| 40 | 4,4'-diamino-3-methoxy-stilbene | 1-ethoxycarbonylamino-8-naphthol-3,6-disulfonic acid |
| 41 | 4,4'-diamino-3-methoxy-stilbene | 2-ethoxycarbonylamino-5-naphthol-1,7-disulfonic acid |
| 42 | 4,4'-diaminostilbene-2,2'-disulfonic acid | 2-ethoxycarbonylamino-5-naphthol-7-sulfonic acid |
| 43 | 4,4'-diaminostilbene-2,2'-disulfonic acid | 1st coupling comp.: 3-ethoxycarbonylamino-5-naphthol-7-sulfonic acid<br>2nd coupling comp.: 1-amino-8-naphthol-3,6-disulfonic acid |
| 44 | 4,4'-diamino-diphenylamine | 1-ethoxycarbonylamino-8-naphthol-3,6-disulfonic acid |
| 45 | 4,4'-diamino-diphenylamine | 1-acetylamino-8-naphthol-3,6-disulfonic acid |
| 46 | 4,4'-diamino-diphenylamine | 1-ureido-8-naphthol-3,6-disulfonic acid |
| 47 | 4,4'-diamino-diphenylamine | 1-methylsulfonylamino-8-naphthol-3,6-disulfonic acid |
| 48 | 4,4'-diamino-diphenylamine | 1-phenylsulfonylamino-8-naphthol-3,6-disulfonic acid |
| 49 | 4,4'-diamino-diphenylamine | 1-p-tolylsulfonylamino-8-naphthol-3,6-disulfonic acid |
| 50 | 4,4'-diamino-2-sulfo-diphenylamine | 1st coupling comp.: 3-ethoxycarbonylamino-2-naphthol-7-sulfonic acid<br>2nd coupling comp.: 1-amino-8-naphthol-3,6-disulfonic acid |
| 51 | 4,4'-diamino-3,3'-dimethoxy-diphenylurea | 1-ethoxycarbonylamino-8-naphthol-3,6-disulfonic acid |
| 52 | 4,4'-diamino-3,3'-dimethoxy-diphenylurea | 1-acetylamino-8-naphthol-3,6-disulfonic acid |

-continued

| Example | Diamine | Coupling Component |
|---|---|---|
| 53 | 4,4'-diamino-3,3'-dimethoxy-diphenylurea | 1-ureido-8-naphthol-3,6-disulfonic acid |
| 54 | 4,4'-diamino-3,3'-dimethoxy-diphenylurea | 1-methylsulfonylamino-8-naphthol-3,6-disulfonic acid |
| 55 | 4,4'-diamino-3,3'-dimethoxy-diphenylurea | 1-phenylsulfonylamino-8-naphthol-3,6-disulfonic acid |
| 56 | 4,4'-diamino-3,3',2,2'-tetramethoxy-diphenylurea | 1-ethoxycarbonylamino-8-naphthol-3,6-disulfonic acid |
| 57 | 2,4-di(3'-methoxy-4'-amino-phenyl-amino)-6-di(2'-hydroxy-ethyl-amino)-1,3,5-triazine | 1-ethoxycarbonylamino-8-naphthol-3,6-disulfonic acid |
| 58 | 2,4-di(3'-methoxy-4'-amino-phenyl-amino)-6-di(2'-hydroxy-ethyl-amino)-1,3,5-triazine | 1-acetylamino-8-naphthol-3,6-disulfonic acid |
| 59 | 2,4-di(3'-methoxy-4'-amino-phenyl-amino)-6-di(2'-hydroxy-ethyl-amino)-1,3,5-triazine | 1-ureido-8-naphthol-3,6-disulfonic acid |
| 60 | 2,4-di(3'-methoxy-4'-amino-phenyl-amino)-6-di(2'-hydroxy-ethyl-amino)-1,3,5-triazine | 1-methylsulfonylamino-8-naphthol-3,6-disulfonic acid |
| 61 | 2,4-di(3'-methoxy-4'-amino-phenyl-amino)-6-di(2'-hydroxy-ethyl-amino)-1,3,5-triazine | 1-phenylsulfonylamino-8-naphthol-3,6-disulfonic acid |
| 62 | 4,4'-diamino-3,3'-dimethoxy-biphenyl | 1st coupling comp.: 1-ethoxy-carbonyl-amino-8-naphthol-3,6-disulfonic acid<br>2nd coupling comp.: 2-(4-amino-3-sulfoanilino)-5-naphthol-7-sulfonic acid |

EXAMPLES 63–68

The dyes described in Examples 28, 29, 40 and 41 are converted, in a manner known per se, into the mono-copper complexes, by means of "demethylating copper-treatment". These complexes are especially suitable for dyeing paper with good fastness properties.

EXAMPLES 69–102

The dyes described in Examples 1–19, 38, 39 and 51–62 are converted, in a manner known per se, into the bis-copper complexes, by means of "demethylating copper-treatment". These complexes are especially suitable for dyeing paper with good fastness properties.

EXAMPLE 103

100 parts of 50% sodium hydroxide solution are added to the crude synthesis solution of the dye described in Example 2 and stirring is carried out for 3 hours at a temperature of from 90 to 95° C. until hydrolysis is complete.

Neutralisation is then carried out using 32% hydrochloric acid and the precipitated dye is filtered off at room temperature. Without further purification operations, there is obtained, in a very high yield, a dye that dyes paper a considerably more brilliant shade than the corresponding dye synthesised without use of the protecting group.

The corresponding dyes having a free amino group can be obtained in analogous manner from the precursors described in Examples 3 to 10, 12, 13, 18, 19, 23, 25, 27, 29, 35, 37, 41, 44, 51, 56 and 57.

What is claimed is:
1. A dye of formula

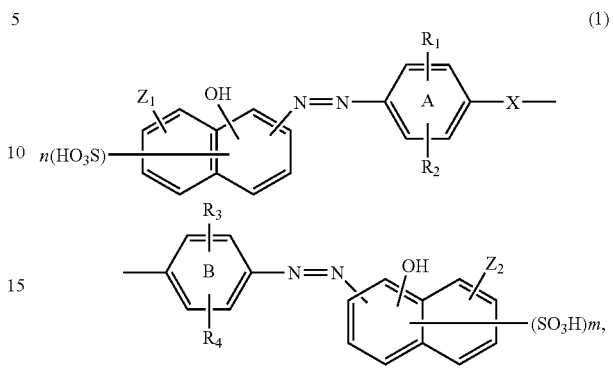

wherein
$Z_1$ is $NHR_6$,
$R_6$ being a radical of formula CO—NH—$R_8$, $SO_2$-alkyl or COOR$_8$,
$R_8$ being hydrogen, alkyl or aryl and
$Z_2$ is as defined for $Z_1$ or is hydrogen, hydroxy, alkoxy or a radical NHR$_5$,
$R_5$ being hydrogen, alkyl, aryl, COR$_8$, CO—NHR$_8$ or SO$_2$R$_8$,
$R_1$ and $R_3$ are each independently of the other hydrogen, hydroxy, alkyl or alkoxy,
$R_2$ and $R_4$ are each independently of the other hydrogen, hydroxy, alkyl or alkoxy, halogen, sulfo, carboxy, NHCONHR$_8$ or NHCOR$_8$,
X is azo, azoxy, —NR$_8$—, —NR$_8$CONR$_9$— or a group of formula

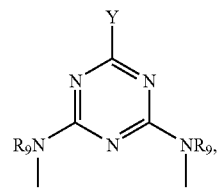

Y being hydroxy, alkoxy or NR$_9$R$_{10}$,
$R_9$ and $R_{10}$ being each independently of the other hydrogen, unsubstituted or substituted alkyl or unsubstituted or substituted aryl,
n and m are each independently of the other 1 or 2,
and wherein the rings A and B may each independently of the other carry a fused-on benzene ring.
2. A dye according to claim 1, wherein $Z_2$ is hydrogen, hydroxy, alkoxy, amino, NH—COO—$C_1$–$C_4$alkyl, or anilino which is unsubstituted or substituted by amino and/or by sulfo.
3. A dye according to claim 1, wherein $Z_1$ is NH—COO—$C_1$–$C_4$ alkyl.
4. A dye according to claim 1, wherein $Z_1$ and $Z_2$ are identical and each is NH—COO—$C_1$–$C_4$ alkyl.
5. A dye according to claim 1, wherein $R_2$ and $R_4$ are each hydrogen, $C_1$–$C_4$alkyl or $C_1$–$C_4$alkoxy.
6. A process for the preparation of a dye of formula (1) according to claim 1, wherein a diamine of formula

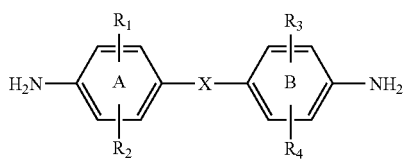

is tetraazotised and coupled with 2 moles of a coupling component of formula

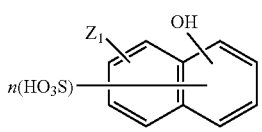

or with 1 mole each of a coupling component of formula (4) and of formula

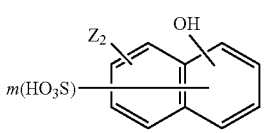

under conditions known per se.

7. A process for the preparation of a dye of formula (1'), wherein
$Z'_1$ is $NHR_8$,
$R_6$ being a radical of formula —CO—NH—$R_8$, $SO_2$-alkyl or $COOR_8$,
$R_8$ being hydrogen, alkyl or aryl and
$Z'_2$ is as defined for $Z'_1$ or is hydrogen, hydroxy, alkoxy or a radical $NHR_5$,
$R_5$ being hydrogen, alkyl, aryl, $COR_8$, CO—$NHR_8$ or $SO_2R_8$,
$R_1$ and $R_3$ are each independently of the other hydrogen, hydroxy, alkyl or alkoxy,
$R_2$ and $R_4$ are each independently of the other hydrogen, hydroxy, alkyl or alkoxy, halogen, sulfo, carboxy, $NHCONHR_8$ or $NHCOR_8$,
X is azo, azoxy, —$NR_8$—, —$NR_8CONR_9$— or a group of formula

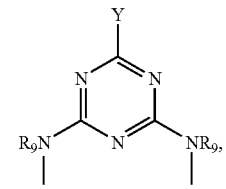

Y being hydroxy, alkoxy or $NR_9R_{10}$,
$R_9$ and $R_{10}$ being each independently of the other hydrogen, unsubstituted or substituted alkyl or unsubstituted or substituted aryl,
n and m are each independently of the other 1 or 2,
and wherein the rings A and B may each independently of the other carry a fused-on benzene ring.

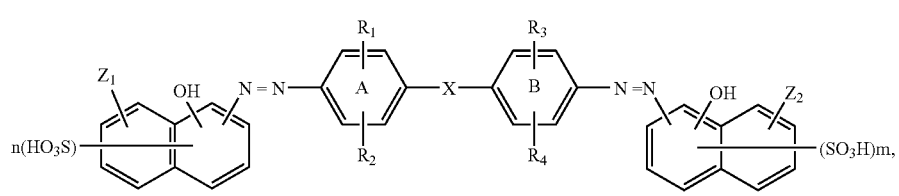

wherein $Z_1$, and $Z_2$ are each independently of the other amino and the other substituents are as defined for a dye of formula (1) in claim 1, in which process there are used dyes of formula (1) wherein $Z_1$ and $Z_2$ are each independently of the other NH—COO—$R_8$, and finally that group is hydrolysed.

8. A method for dyeing paper, which comprises contacting the paper with a tinctorially effective amount of a dye of formula 9. A solid dye preparation for dyeing paper, comprising dye of formula (1) according to claim 1 and, optionally, further additives.

10. A concentrated aqueous solution for dyeing paper, comprising a dye of formula (1) according to claim 1 and, optionally, further auxiliaries.

11. Paper dyed using a dye of formula (1) according to claim 1.

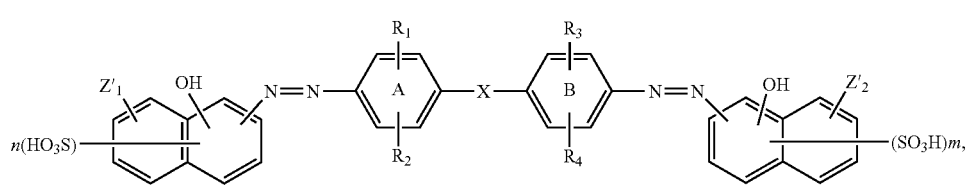

12. A dye according to claim 2, wherein $Z_1$ is NH—COO—$C_1$–$C_4$alkyl.

13. A dye according to claim 3, wherein $Z_1$ and $Z_2$ are identical and each is NH—COO—$C_1$–$C_4$alkyl.

14. A dye according to claim 4, wherein $R_2$ and $R_4$ are each hydrogen, $C_1$–$C_4$alkyl or $C_1$–$C_4$alkoxy.

15. Paper dyed using a solid dye preparation according to claim 9.

16. Paper dyed using a concentrated aqueous solution according to claim 10.

* * * * *